N. CARO.
PROCESS OF OBTAINING AMMONIA.
APPLICATION FILED MAR. 23, 1909.
970,833. Patented Sept. 20, 1910.
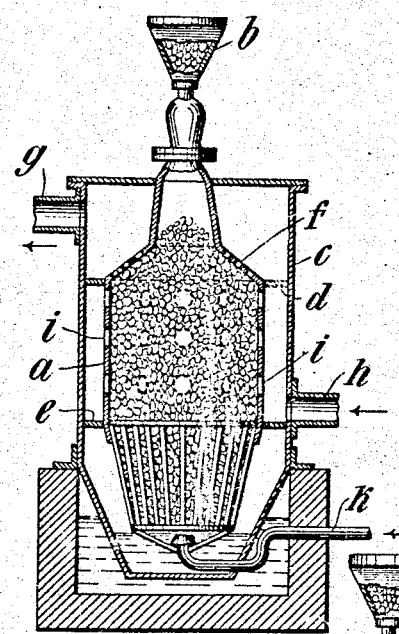
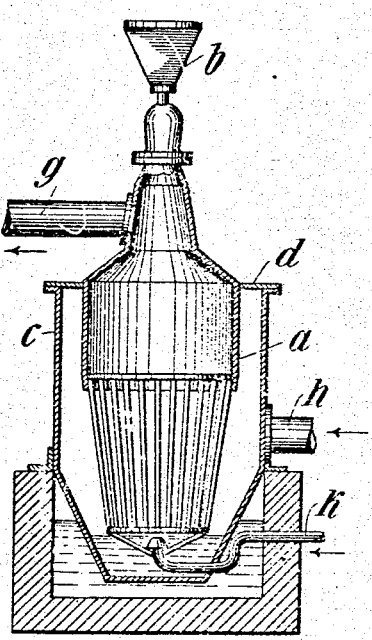
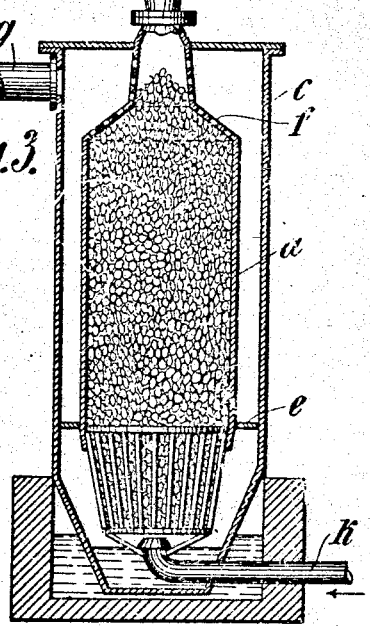
Witnesses.
Inventor.
Nikodem Caro

UNITED STATES PATENT OFFICE.

NIKODEM CARO, OF BERLIN, GERMANY.

PROCESS OF OBTAINING AMMONIA.

970,883. Specification of Letters Patent. Patented Sept. 20, 1910.

Application filed March 23, 1909. Serial No. 485,153.

*To all whom it may concern:*

Be it known that I, NIKODEM CARO, a subject of the King of Prussia, residing at 20 Meineckestrasse, Berlin, Germany, have invented certain new and useful Improvements in Processes of Obtaining Ammonia; and I do hereby declare the following to be a full, clear, and exact description of the invention.

The object of my invention is to provide an improved process of obtaining ammonia and consists in gasifying peat, or other highly oxygenous organic materials containing nitrogen and water, by supplying limited quantities of air and an excess of steam, whereby the nitrogen of the treated material is obtained as ammonia or compounds of ammonia on the one hand, and on the other hand profitable combustible gases, adapted for driving motors for example, it being understood that peat is selected merely as a typical example in this specification of such organic materials.

When peat is gasified in the customary manner in producers, the yield of gas is not as large as may be, and of nitrogen in the form of ammonia does not correspond sufficiently to the percentage of nitrogen in the treated material. The reason for this is that the process in this gasification is as follows: Namely, the process is such that at first water is liberated from the peat in the upper parts of the producer, by vaporization, or the peat is decomposed, water being formed chemically and likewise escaping. In consequence of this vaporization of the mechanically existing, or chemically formed, or bound water, there is a very low temperature in this zone and the peat is decomposed without gases of appreciable calorific value being formed and without the nitrogenous substance being hydrolyzed, and consequently without ammonia being formed. There then remains a solid, nitrogenous residue which, however, owing to the action of the steam, is vaporized and hydrolyzed only with very great difficulty and imperfectly, so that only a poor output of gas and very poor output of ammonia is obtained when such a mode of working is employed in the producer. If peat be treated, however, by supplying limited quantities of air and an excess of steam in such a manner that the mechanically or chemically bound, or chemically formed water, escapes at such a high temperature that the nitrogenous substance of the peat is simultaneously hydrolyzed and ammonia formed, gas of valuable calorific intensity suitable for heating and power purposes can be profitably obtained and the nitrogen converted into ammonia and a good output of the latter obtained.

In consequence of the manner in which peat forms, it always contains somewhat large quantities of water which can be reduced for example to 20% by an economical mode of drying this material, namely natural drying, but this is only the so-called summer-peat, whereas, as to the rest, only a material having 40% of water is obtained on an average. The peat substance is composed on an average of 60% carbon, 5% hydrogen and 35% oxygen. Accordingly, when the gaseous or vaporous products are being distilled off, the peat substance yields more than 37% water. Now if peat is treated in such manner that water is evolved at a relatively high temperature, so that simultaneously with the disengagement of the water, hydrolysis takes place, then a portion of the volatile substance of the peat is obtained as gas of useful calorific intensity, and the greatest part of the nitrogen of the peat is converted into ammonia and, protected by the steam, and is obtained with the gases. Accordingly, I take care that the high temperature necessary for the hydrolysis exists in the zone where water is disengaged. According to my invention this object can be obtained by subjecting the nitrogenous organic material, as the most prominent example of which peat is selected for the above description, to the treatment in producers to which the mixture of air with an excess of steam is supplied preferably at as many places as possible. In this manner part of the combustible gas formed in the zone in which water is liberated, and part of the combustible gas formed in the lower zone as well as part of the distillation gas formed in the lower zone are burned and produce locally the high temperature necessary for the hydrolysis. The quantity of the steam which is employed must not be less than ¼ ton per ton of the material to be worked up, and its pressure preferably not under 250 mm. of water.

In order that the invention may be clearly understood reference will be made to the accompanying drawing in which apparatus for carrying the process into practice is represented by way of example, and in which:

Figure 1 is an elevation partly in section showing one form of producer, Fig. 2 is a like view of a modified form, and Fig. 3 is a like view of a third form.

Similar reference characters denote corresponding parts in all views.

Referring to the drawing and particularly to Fig. 1, the material, for example peat, is fed into the producer $a$ through the hopper $b$ which is so connected with the producer that when the latter is being charged no air can enter; this can be carried into practice in known manner by means of a double closure. This producer is provided with a jacket $c$ in such manner that the central part of the producer can be shut off from the top and bottom portions of the jacketing chamber by transverse partitions $d$ and $e$. The top part of the generator is provided with holes $f$ for conducting away the escaping gases which can then be led away through the discharge pipe $g$. This pipe may also, however, be connected directly with the producer as shown in Fig. 2. The mixture of air with an excess of steam is introduced through the admission pipe $h$ into the central jacketing chamber and it can penetrate through the holes $i$ at many places into the peat in the producer, while a like mixture of air and steam is supplied through the pipe $k$ to the bottom part of the producer, whose wall is here formed like a grate, into the material after the same has been ignited at the beginning of the process in this bottom part. The whole apparatus is closed below by means of water, as clearly shown.

As soon as the process is fully in operation, the material, from which gaseous and vaporous products have been distilled off and which consists essentially of carbon, in the bottom part of the producer is gasified with the aid of hot steam. The air mixed with it causes a certain combustion and a heating effect occasioned thereby which is transmitted to the upper layers; the above mentioned mixture of steam and air also enters through the numerous holes $i$ into the upper part of the charge and brings about gasification with hydrolyzing action in such manner that the nitrogen for the most part is converted into ammonia which escapes with the combustible gases which are thereby forced through the holes $f$ and discharge pipe $g$ and can be then conducted to the ammonia absorbers, from which the remaining combustible gases can be taken away for employment as illuminating, heating or power gases or the like. The process can be carried into practice similarly when an apparatus as shown in Fig. 2 is employed. In this apparatus the holes $f$ and $i$ shown in Fig. 1 are omitted. On the other hand, the part of the producer which is surrounded by the grate-like casing is enlarged in such manner that the described mixture of air and steam can pass through the air spaces to the hydrolyzing zone, as in the apparatus according to Fig. 1 through the holes $i$. In this event the bottom closure $e$ of the jacketing chamber is superfluous. The mixture of air and steam passes through the supply pipe $h$ between the air spaces of the grate, which extends far into the apparatus, into the hydrolyzing zone, and a like mixture of air and steam is introduced through the pipe $k$ from below in addition into the material which is being treated. The process according to the present invention may, however, also be carried into practice by supplying the described mixture of air and steam at one place, but highly superheating it before its admission in such manner that high temperatures are produced in the combustion zone of the producer particularly, whereby the products of combustion and heating gases which are formed are also so highly superheated that they produce the high temperature necessary for the hydrolyzation in practically the entire hydrolyzing zone. This mode of working may also be carried into practice, for example, by constructing for the same the producer as represented in Fig. 3, which in proportion to its breadth is relatively high, whereby the combustion zone is greatly increased in proportion to the hydrolyzing zone, so that here also the products of combustion, which form in relatively large quantities in such a case, are superheated and practically the entire hydrolyzing zone is superheated. Consequently, Fig. 3 shows only one pipe $k$ for supplying air and steam. The relatively long side wall of the producer $a$ is not provided with the holes $i$ shown in Fig. 1, but has the holes $f$ only in its top portion for conducting away the escaping gases and the ammonia. Consequently, the top partition $d$ also is not necessary here, and the supply pipe $h$ is also unnecessary. The gases which pass through the holes $f$ into the chamber inclosed by the jacket $c$ are led away through the discharge pipe $g$ from the producer $a$ and can then be conducted to the ammonia absorbers, which, since they do not form part of the invention, are not shown in the drawing, and from which the remaining combustible gases can be removed and employed at will as illuminating, heating or power gases.

A temperature in the hydrolyzing zone of at least 250° C. is necessary in every case for the above described process, of which different modes of carrying the same into practice have been described, and it is also a characteristic feature of the invention that the gases leaving the producer have a temperature which is higher than 100° C., although the material treated, peat for example, having up to 50% of water is employed for being gasified.

An important advantage of my process consists in it being possible to employ peat dried in heaps, namely material which can be obtained during the entire year from the peat moors and which contains from 40% to 60% of water. Not only is about 80% of the nitrogen contained in the peat obtained in the form of ammonia, but also a large quantity of combustible gas which corresponds to approximately 1000 horse-power hours per ton of gasified material, calculated with reference to dry material.

I claim:

1. The process of obtaining ammonia from organic material having a high oxygen and nitrogen content which comprises charging the material into a gas producer, maintaining a sufficiently rapid combustion in the lower part of the charge to produce a temperature in the upper part of the charge sufficient to simultaneously vaporize the water and decompose the material of the charge at the same point thereof and supplying to the charge a large quantity of steam with a small quantity of air, thereby causing the nitrogen of the charge to combine with the hydrogen to convert substantially all of the nitrogen into ammonia at the same point that the vaporization of the water contained in the charge takes place.

2. The process of obtaining ammonia from organic material having a high oxygen and nitrogen content which comprises charging the material into a gas producer, maintaining a combustion in the lower part of the charge sufficiently rapid to produce a temperature in the upper part of the charge sufficient to simultaneously vaporize the water and decompose the material of the charge at the same point thereof, and supplying to the charge a large quantity of superheated steam with a small quantity of air.

In testimony that I claim the foregoing as my invention, I have signed my name in presence of two subscribing witnesses.

NIKODEM CARO.

Witnesses:
HENRY HASLER,
WOLDEMAR HAUPT.